No. 639,991. Patented Dec. 26, 1899.
M. R. JEWELL.
MEANS FOR STORING BICYCLES.
(Application filed Jan. 22, 1898.)
(No Model.) 2 Sheets—Sheet 1.
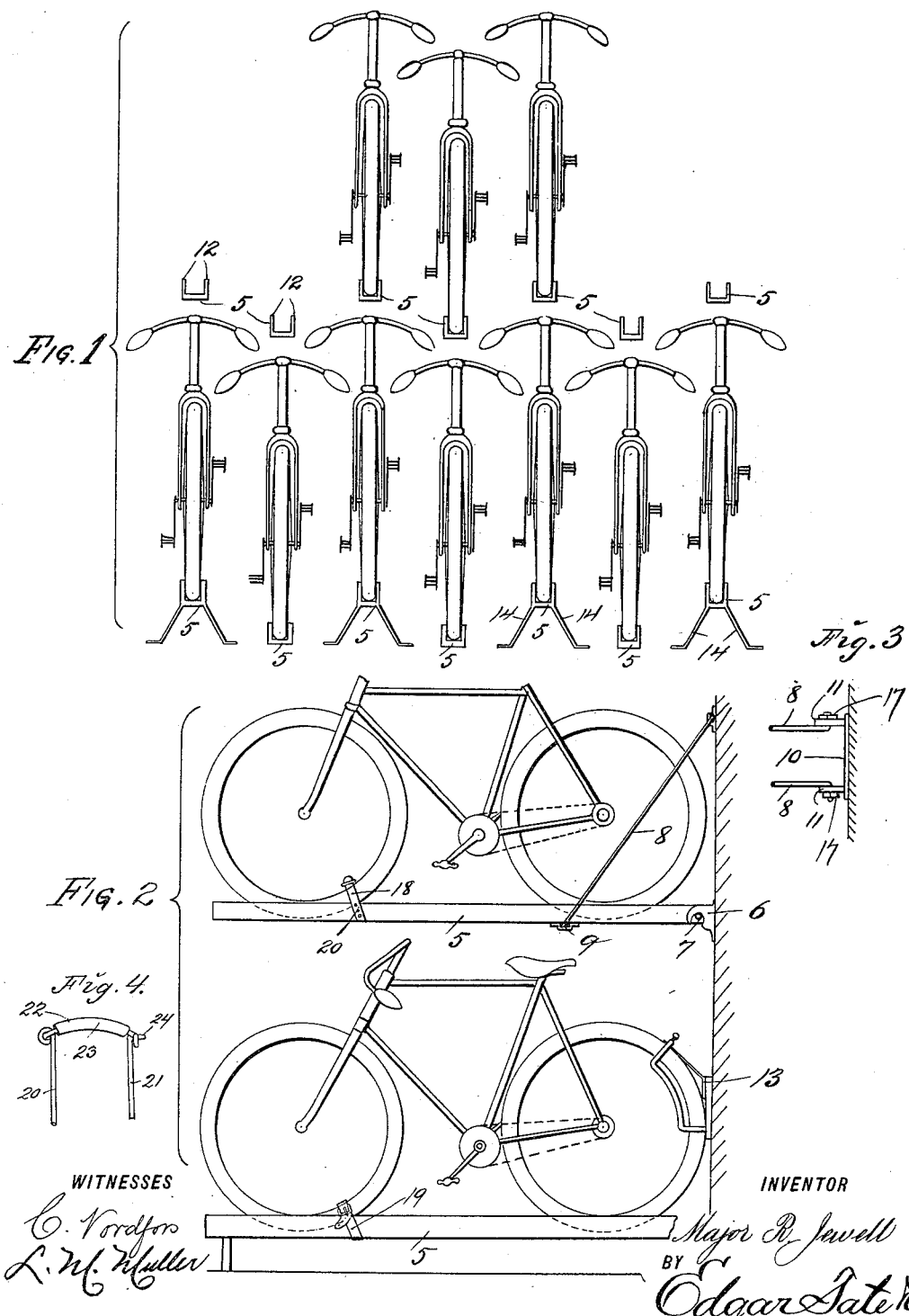
WITNESSES
INVENTOR
Major R. Jewell
BY Edgar Gate & Co.
ATTORNEYS

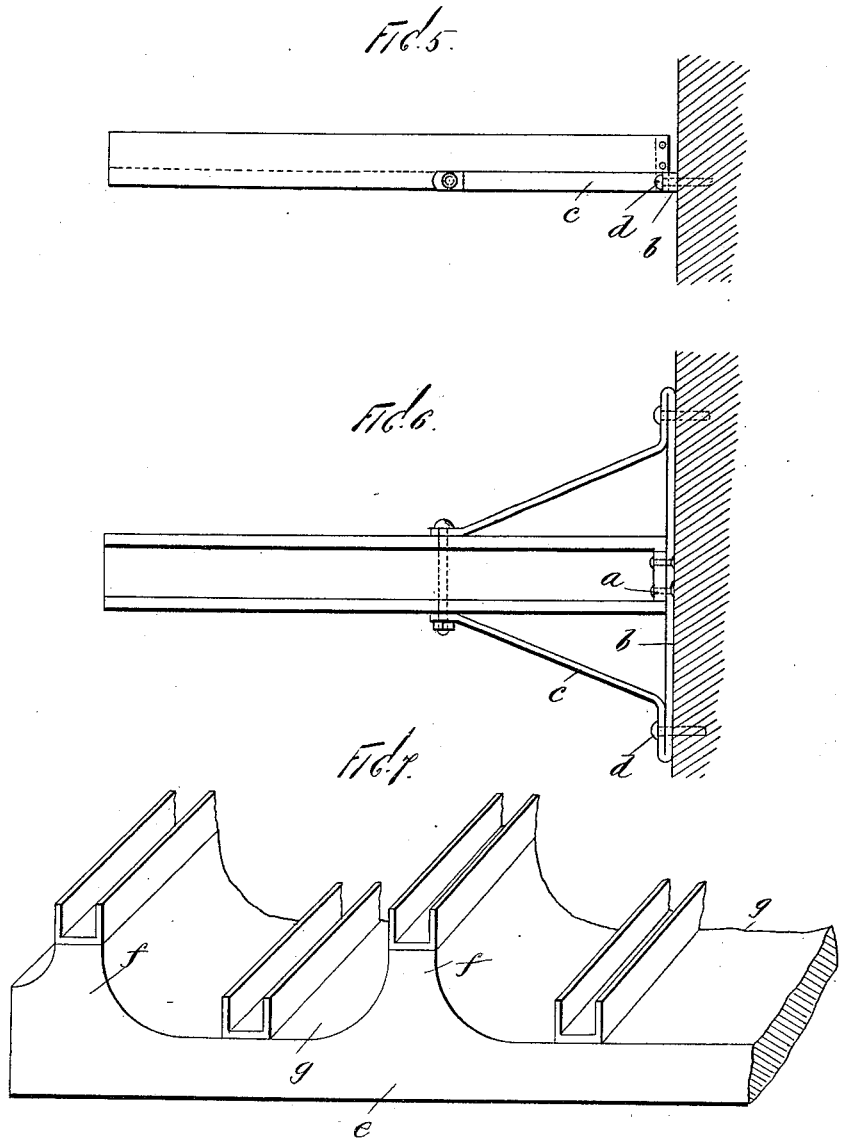

UNITED STATES PATENT OFFICE.

MAJOR ROMEYN JEWELL, OF SENECA FALLS, NEW YORK.

MEANS FOR STORING BICYCLES.

SPECIFICATION forming part of Letters Patent No. 639,991, dated December 26, 1899.

Application filed January 22, 1898. Serial No. 667,579. (No model.)

*To all whom it may concern:*

Be it known that I, MAJOR ROMEYN JEWELL, a citizen of the United States, residing at Seneca Falls, in the county of Seneca and State of New York, have invented certain new and useful Improvements in Systems for Storing Bicycles, of which the following is a full and complete specification, such as will enable those skilled in the art to which it appertains to make and use the same.

This invention relates to an improved system for storing bicycles for transportation and other purposes; and the object thereof is to provide improved holders or guides for bicycles, which are arranged according to a system hereinafter described, said system being particularly adapted for use in transporting bicycles in large quantities and in storing the same in sales-rooms, club-rooms, riding-schools, and all other places where a considerable number of bicycles are placed on exhibition or taken care of.

The invention is fully disclosed in the following specification, of which the accompanying drawings form a part, in which—

Figure 1 is a front view of a number of bicycles supported according to my invention. Fig. 2 is a side view thereof. Fig. 3 represents a detail of the construction; Fig. 4, a detail of the construction. Fig. 5 is a side elevation of another guide-support constructed in accordance with this invention. Fig. 6 is a plan of the same, and Fig. 7 is a perspective of still another form of guide-support.

In the practice of my invention I provide guide-supports 5, which are trough-shaped in cross-section and of suitable length, said guide-supports being preferably provided with vertical sides, and one row of these supports are supported on and near the floor in such manner that each alternate guide-support is higher than the other, as shown in Fig. 1, and by means of this arrangement the said supports may be placed much closer together than would otherwise be possible, the handle-bars connected with one bicycle overlapping those of the adjoining one, as clearly shown in said figures, and by means of this arrangement it will be apparent that the pedals will also not interfere. I also place directly over the first row of guide-supports, which are located on or near the floor and supported thereon or from the wall in any desired manner, another row, as shown in Figs. 1 and 2, which are similiarly arranged and connected with the wall in any desired manner, so as to be easily removed when desired. For this purpose I employ bracket plates or hooks 6 for each guide-support, said bracket plates or hooks being secured to the wall, and one end of the guide-support is provided with projecting pins 7, which are adapted to engage with said hooks or with openings formed in said plates, and I also provide side rods 8, which are preferably formed in one continuous piece and passing under the guide-support and being attached thereto by staples or any other suitable fastening device, and said rods are provided at their upper ends with outwardly-directed extensions or arms which are adapted to engage with wall-brackets 10 or with shoulders, projections, or hooks 11 formed thereon, and the outer ends of said extensions are provided with heads or washers 17, whereby they are held in place.

The trough or guide-supports 5 may be made of sheet metal or of wood, and the space between the vertical sides 12 thereof is such as to admit of the tires and rim of the wheels being inserted thereinto, and said wheels are securely held thereby, and I also provide in connection with each of the guide-supports placed upon the floor a wall bracket or clamp, as shown at 13, which is adapted to be secured to the wall and to grasp the wheel of the bicycle, so as to hold it in an upright position on the guide-support, or the lower row can also be provided with suspension side rods and attachments, the same as shown in the upper row.

In the case of the upper guide-supports the rods 8 serve for this purpose, as will be readily understood, and the upper guide-supports are detachable from the wall, and the lower ones may be detachably connected with the floor or simply placed thereon.

In practice the guide-supports are made nearly the same length as the bicycle, or at least of such length as to project beyond the center of the outer wheel when the bicycle is placed thereon, and in placing the bicycles on the support the guide-wheel is usually placed in the forward end of the trough or guide and the vehicle moved backwardly in said support to the farthest extent or until it reaches the wall.

The clamp 13 for holding the lower line of bicycles in position may be made of any desired form and may be connected with the wall in any desired manner and is simply intended to clasp and hold the wheel so as to maintain the bicycle in an upright position on the guide-support.

The alternate guide-supports, which are arranged upon the floor, may be provided with legs 14, if desired, or may be raised by any preferred means, and in some cases it may be desirable to provide pins designed to enter notches or recesses in the floor simply to steady the supports, this construction being preferable where the system is employed in connection with railway-cars for shipping purposes and being designed to hold the bicycle steady and to prevent the movement of the supports, and, if desirable, the alternate supports in the lower row, or those which are arranged above the others, may be supported by the same means herein described for supporting the upper tier or row. (Shown in Fig. 2.)

In the system now practiced for storing bicycles in sales-rooms, club-rooms, riding-schools, and other places where a considerable number of bicycles are placed on exhibition or taken care of they are generally placed either running straight out from the wall or at an angle running to the right or left and about twenty-four inches apart, this space being necessary to allow for any variations in the lengths of the handle-bars and to prevent the latter from interfering or coming in contact with each other when the bicycles are placed in position or withdrawn from their supports; but with my improved system I am enabled to store six bicycles in the floor-space heretofore occupied by two, and my improved supports are so arranged that when the bicycles are placed in position or moved backwardly on the supports the handle-bars thereof will not interfere.

I also provide additional means for securing the bicycles in holders, as shown at 18 and 19 in Fig. 2. This device, as shown at 19, consists of an ordinary strap provided with a buckle and which is passed around the holder or supports and around the rim and tire of the vehicle, and said strap may be secured in the holder, if necessary, and the device employed for this purpose, as 18, is shown in Fig. 4 and consists of two metal strips 20 and 21, which are secured to the sides of the holder and to the end of one of which is hinged a curved rod 22, which is provided with a tubular covering 23, of rubber or similar material, which is also provided at its free end with an eye or hook which is adapted to engage with a hook or eye formed on the end of the opposite strip 21, as shown at 24, and the rod 21 is adapted to be passed around the rim and tire of one of the wheels of the vehicle, as shown in Fig. 2.

It will be understood that each row of the troughs or guides may be removed or stored away whenever necessary, and this feature is of particular advantage in the case of railway-cars, where the car may be desired for other purposes at any time, and my invention is not limited to the material from which the troughs or guides are formed, nor to the number thereof employed.

In bicycle-club rooms or rooms for storing bicycles and in similar places the lower tier of guide-supports may be permanently secured in position, and in all such cases the clamp 13 should be of such form that the wheel can be pushed thereinto or disconnected therefrom without applying the hands thereto.

In Figs. 5 and 6 the guide-support preferably used is shown and has the trough-like extension shown in the other figures. The inner end of this trough is closed and fastened by means of bolts, screws, or rivets $a$ to a plate or strip $b$. The said plate or strip $b$ extends some distance on both sides thereof and then has the angular extensions $c$, that are bolted or otherwise secured at their outer ends to the said support. The extensions $c$ form continuations of the plate $b$, and at the outer ends of the latter the extensions lie flat against the same. Bolts or screws $d$ pass through the extremities of the plate and extensions and serve as the supporting means for said guides.

In Fig. 7 another form of the guide-support that is preferable for the lower tier is shown and consists of a block $e$, having uprising projections or ribs $f$ and the intervening depressions or valleys $g$. The guide-support troughs are respectively mounted upon the ribs and in the depressions, as shown, and thus afford the arrangement of alternate supports situated in different planes.

Having fully described my invention, I claim as new and desire to secure by Letters Patent—

1. In a system for storing bicycles, the combination with a wall or other support, of a plurality of longitudinal trough-shaped holders arranged upon or adjacent to the floor, said holders being of a length to receive both wheels of a bicycle, and to retain them in alinement and serve as guides therefor, said holders being at such a distance apart that the handle-bars of the wheels of the bicycles are but slightly separated, a plurality of rods or clamps upon a support at the rear of the bicycles to retain them in an upright position, and a plurality of similarly-formed holders mounted upon uprights or legs secured to the floor, said holders being thereby arranged upon a substantially higher level and alternately between the holders of the lower series, whereby a second row of bicycles may be supported between those of the lower row without interference between the handle-bars, and a corresponding series of rear rods or clamps secured to the wall or support to hold said upper row of bicycles in an upright position, substantially as shown and described.

2. A bicycle-holder, comprising a trough-shaped guide or support detachably connected with a wall or other support so as to be folded adjacent thereto and adapted to be projected outwardly from said wall or support so as to receive and hold both wheels of the bicycle, and means for securing or holding said guide or support in a projected position, substantially as shown and described.

3. A bicycle-holder consisting of a trough-shaped support adapted to receive and guide both wheels of a bicycle, said support being pivotally and detachably connected with a wall or similar support and adapted to swing vertically, one or more rods or braces detachably connected with the wall and with said support so as to hold the latter in a horizontal or projected position and to suspend the same when not in use adjacent to the wall or other support, substantially as shown and described.

4. The herein-described system for the storage or transportation of bicycles, consisting of a tier or series of trough-shaped holders arranged upon a common level, and suitably supported upon the floor, and another tier or series of similar holders arranged upon a substantially higher level and alternately between the holders of the lower tier or series, and supported from the floor or a wall or other support, and two other tiers or series arranged above the first two and in a similar manner, whereby bicycles may be supported by the holders of each series without interference between the handle-bars and the pedal-cranks, the two upper series being pivotally connected with a wall or other support and adapted to swing vertically, and means for holding the same in a horizontal position, substantially as shown and described.

5. A holder for bicycles, comprising a trough-shaped support adapted to receive both wheels of the bicycle, and to hold the bicycle in an upright position, a plate secured to one end and transversely thereof and adapted to be secured to a wall or other support, and pins connected with the outer ends of said plate and with the side of the trough-shaped support, substantially as shown and described.

6. The herein-described means for the storage of bicycles, consisting of separate holders adapted to receive both wheels of a bicycle, and to hold the bicycle in an upright position, said holders being arranged in different horizontal series, one of which is higher than the other, and the holders of the upper series being arranged alternately between the holders of the lower series, and means for detachably connecting said holders with a wall or other support, and for holding the same in a horizontal position, substantially as shown and described.

7. The herein-described means for the storage of bicycles, consisting of a tier or series of holders or supports adapted to receive both wheels of the bicycle and to hold the bicycle in an upright position, said holders or supports being arranged upon a common level so that the bicycles will be held approximately parallel and closely adjacent, and another tier or series of similar holders or supports arranged upon a higher level and alternately between the holders or supports of the lower tier or series, whereby a second row of bicycles may be supported between those of the lower row without interference of the handle-bars, said holders or supports being arranged adjacent to a wall or other upright, and clamps connected with the wall or other upright over each of the bicycle holders or supports of each of said tiers or series and adapted to grasp and hold one of the wheels of the bicycle, substantially as shown and described.

8. A holder for bicycles arranged adjacent to or connected with a wall or upright, and comprising a trough-shaped support adapted to receive both wheels of a bicycle and to hold the bicycle in an upright position, and a clamp adapted to be connected with the wall or upright over said trough-shaped support and adapted to grasp and hold one of the wheels of the bicycle, substantially as shown and described.

9. The herein-described means for the storage of bicycles, consisting of a tier or series of holders or supports adapted to receive both wheels of the bicycle and to hold the bicycle in an upright position, said holders or supports being arranged upon a common level so that the bicycles will be held approximately parallel and closely adjacent, and another tier or series of holders or supports arranged upon a higher level and alternately between the holders or supports of the lower tier or series whereby a second row of bicycles may be supported between those of the lower row without interference of the handle-bars and corresponding tiers or series of auxiliary holders mounted vertically above one end of the main holders or supports and adapted to grasp and hold one of the wheels of the bicycle, substantially as shown and described.

10. A holder for bicycles, comprising a trough-shaped support adapted to receive both wheels of a bicycle and to hold the bicycle in an upright position, and a vertical supporting device mounted and arranged above one end of the trough-shaped support and adapted to grasp and hold one of the wheels of the bicycle upon the edge thereof whereby the wheel may be slid into the trough-shaped support and into the vertically-arranged holder to be supported jointly thereby, substantially as shown and described.

In testimony that I claim the foregoing as my invention I have signed my name, in presence of the subscribing witnesses, this 18th day of January, 1898.

MAJOR ROMEYN JEWELL.

Witnesses:
M. A. KNOWLES,
L. M. MULLER.